United States Patent
Chen et al.

(10) Patent No.: US 10,267,916 B2
(45) Date of Patent: Apr. 23, 2019

(54) THREE-DIMENSIONAL CONSTRUCTION SYSTEMS AND METHODS FOR CREATING AN OBJECT

(71) Applicant: Caterpillar Inc., Peoria, IL (US)

(72) Inventors: Qi Chen, Dunlap, IL (US); Eric Alan Reiners, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 234 days.

(21) Appl. No.: 15/131,715

(22) Filed: Apr. 18, 2016

(65) Prior Publication Data

US 2017/0300038 A1    Oct. 19, 2017

(51) Int. Cl.
| | |
|---|---|
| *G05B 19/4099* | (2006.01) |
| *G01S 17/88* | (2006.01) |
| *B33Y 50/02* | (2015.01) |
| *B29C 64/106* | (2017.01) |
| *B29C 64/393* | (2017.01) |

(52) U.S. Cl.
CPC ............ *G01S 17/88* (2013.01); *B29C 64/106* (2017.08); *B29C 64/393* (2017.08); *B33Y 50/02* (2014.12); *G05B 2219/35134* (2013.01); *G05B 2219/49007* (2013.01)

(58) Field of Classification Search
CPC .. B29C 67/0088; B29C 64/393; B29C 64/106; G05B 19/4099; G05B 2219/35134; G05B 2219/49007; B33Y 50/02; G01S 17/88
See application file for complete search history.

(56) References Cited

U.S. PATENT DOCUMENTS

| | | | | |
|---|---|---|---|---|
| 9,254,535 | B2 * | 2/2016 | Buller | B23K 26/346 |
| 9,364,995 | B2 * | 6/2016 | Roberts, IV | B29C 67/0088 |
| 9,411,413 | B2 * | 8/2016 | Motta | G06F 3/012 |
| 9,457,901 | B2 * | 10/2016 | Bertrand | A63H 27/12 |
| 9,573,225 | B2 * | 2/2017 | Buller | B23K 26/346 |
| 9,688,024 | B2 * | 6/2017 | Stava | B29C 67/0088 |
| 9,724,876 | B2 * | 8/2017 | Cheverton | B29C 64/386 |
| 9,833,948 | B2 * | 12/2017 | Stava | B29C 64/386 |
| 2007/0013724 | A1 | 1/2007 | Swift | |
| 2008/0148683 | A1 | 6/2008 | Dini et al. | |
| 2014/0163717 | A1 | 6/2014 | Das et al. | |
| 2015/0045928 | A1 | 2/2015 | Perez et al. | |
| 2015/0165683 | A1 | 6/2015 | Cheverton et al. | |

(Continued)

FOREIGN PATENT DOCUMENTS

| | | |
|---|---|---|
| CN | 104210108 | 12/2014 |
| GB | 2510598 | 8/2014 |

*Primary Examiner* — Van H Nguyen
(74) *Attorney, Agent, or Firm* — Bookoff McAndrews

(57) ABSTRACT

A 3D construction system for creating an object includes, among other components, an online 3D blueprint model for the object and a 3D print head. An online control plan for controlling operation of the 3D print head to create the object according to the online 3D blueprint model is also provided. At least one 3D perception sensor scans a constructed portion of the object to generate sensor readings. A processing device, which is part of a computer system, creates an online 3D replica model of the constructed portion of the object using the sensor readings, and compares the online 3D replica model to the online 3D blueprint model or an ideal printed 3D model to identify a difference. The online control plan is modified responsive to the difference.

20 Claims, 2 Drawing Sheets

(56) References Cited

U.S. PATENT DOCUMENTS

2016/0086258 A1* 3/2016 Romes ............... G06Q 30/0641
                                              705/27.1
2016/0288417 A1* 10/2016 McCann ............. B29C 67/0074

* cited by examiner

THREE-DIMENSIONAL CONSTRUCTION SYSTEMS AND METHODS FOR CREATING AN OBJECT

TECHNICAL FIELD

The present disclosure relates generally to a system and method for 3D printing, or construction, of an object.

BACKGROUND 3D printing, or construction, is also referred to as additive manufacturing and generally includes the creation of a 3D object using a 3D printer. A 3D model, or other electronic data, is often used, along with numerical control programming code or other control software or code, to "print," or deposit, material onto a structure or surface to create the object represented by the 3D model using the 3D printer. Although 3D printers can create objects with great precision, they still suffer from problems during the printing, or construction, process that can lead to defects in the resulting object. For example, the material may fall, the print head or delivery system may experience movement or disruption, and/or a number of other errors may occur. As should be appreciated, a small defect may expand into a large defect, sometimes rendering the object unusable and resulting in a significant amount of waste.

U.S. Patent Application Publication No. 2015/0165683 to Cheverton et al. discloses a 3D manufacturing apparatus for printing 3D objects. Performance of the 3D manufacturing apparatus is assessed, according to the disclosure, by obtaining images of an area of a build platform for the object, and evaluating the images to determine whether an operational flaw has occurred.

As should be appreciated, there is a continuing need to provide improved 3D printing, or construction, systems and methods, particularly as the use of additive manufacturing becomes more widespread. The present disclosure is directed to such an endeavor.

SUMMARY OF THE INVENTION

In one aspect, a 3D construction system for creating an object includes an online 3D blueprint model for the object and a 3D print head. An online control plan for controlling operation of the 3D print head to create the object according to the online 3D blueprint model is also provided. At least one 3D perception sensor scans a constructed portion of the object to generate sensor readings. A processing device creates an online 3D replica model of the constructed portion of the object using the sensor readings, and compares the online 3D replica model to the online 3D blueprint model or an ideal printed 3D model to identify a difference. The online control plan is modified responsive to the difference.

In another aspect, a 3D construction method for creating an object using a 3D construction system, similar to that described above, is provided. The 3D construction method includes steps of providing an online 3D blueprint model for the object and controlling operation of a 3D print head to create the object according to the online 3D blueprint model using an online control plan. The 3D construction method also includes steps of: scanning a constructed portion of the object using at least one 3D perception sensor; creating an online 3D replica model of the constructed portion of the object using sensor readings from the at least one 3D perception sensor; comparing the online 3D replica model to the online 3D blueprint model or an ideal printed 3D model to identify a difference; and modifying the online control plan responsive to the difference.

DETAILED DESCRIPTION

Figure 1:
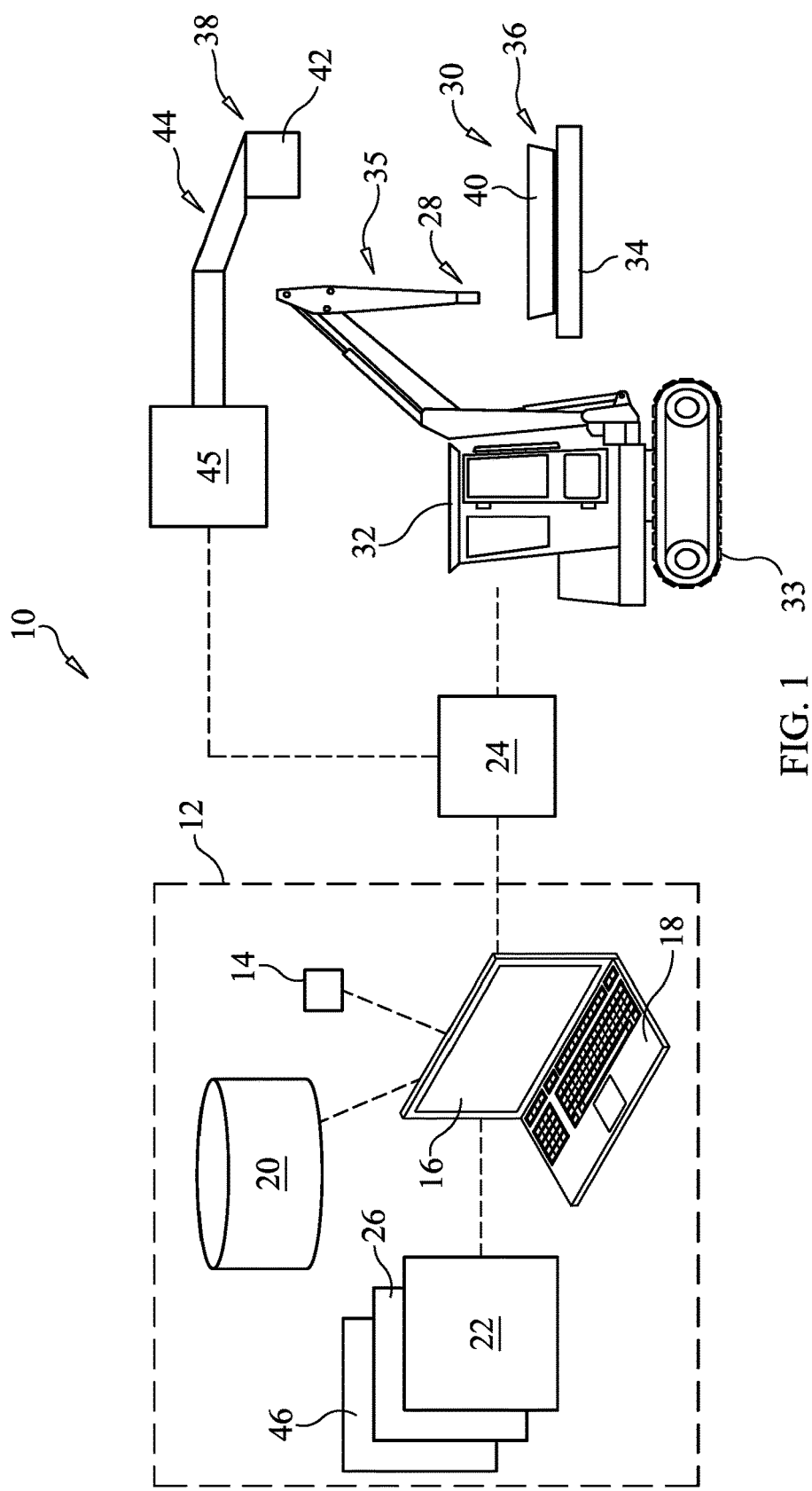
FIG. 1 is a block diagram of a 3D construction system, according to an exemplary embodiment of the present disclosure.

Turning first to FIG. 1, an exemplary 3D construction system according to the present disclosure is shown generally at 10. The 3D construction system 10 may include a variety of components, including various combinations of hardware and/or software, known by those skilled in the art, for creating objects using 3D printing technology, also known as additive manufacturing. The present disclosure has applicability to various printing technologies for printing, or creating, various objects of various sizes with various materials. Although an exemplary embodiment is described, the scope of the present disclosure should not be unduly limited.

The exemplary 3D construction system 10 includes a computer device 12, or system, which may generally include one or more processing devices 14, or processors, a visual display 16 providing a graphical user interface, and at least one user input device 18 for facilitating user interaction with the computer system 12. A database 20, or other electronic storage device, may be provided, internal and/or external relative to the computer device 12 for storing various data that may be utilized or accessed by the computer device 12. Computers, or computer devices, generally perform operations and/or calculations and may be characterized as general purpose devices or special purpose devices.

As should be appreciated, a computer system, such as computer device, or system, 12, generally consists of hardware and software useful in performing tasks. The software is typically divided into system software and application software. The application software interfaces with the user and the system software, while the system software interfaces with the hardware. The system software generally includes the operating system software and firmware. The application software, mentioned throughout, is used to accomplish tasks, i.e., computer implemented tasks. Since computer devices, such as computer device or system 12, are known to those skilled in the art, they will not be discussed herein in greater detail.

According to the present disclosure, software, or programming code, may be provided on, accessed by, and/or executed on the computer device/system 12, or any portion thereof, to create, manipulate and/or access one or more online 3D models, or blueprints, 22. For example, a variety of computer aided design (CAD) software and/or animation modeling software, or programs, are available for creating one or more online 3D blueprint models 22, or virtual designs, of objects to be created with the 3D construction system 10. Alternatively or additionally, ready-made designs or blueprints may be provided for use with the 3D construction system 10.

Software and/or programming code on the computer device 12 and/or a 3D printer 24, which is in communication with the computer device 12, may divide the object, or online 3D blueprint model 22, into cross-sections, or portions, so the 3D printer 24 can build the object layer by layer, in a known manner. The software may include or may be incorporated into an online control plan 26, or printing execution plan code, for controlling operation of the 3D printer 24, in a known manner. Specifically, for example, the online control program 26, which may include a numerical control programming code, such as G-code, or other software or code, may be used to control operation of the 3D printer and a 3D print head 28 to create the object 30 according to the online 3D blueprint model 22. The online control plan 26 may be created, stored and/or executed on the computer device 12 and/or any other component considered part of the 3D construction system 10.

The 3D printer 24 may be in communication with the computer device 12, via wired and/or wireless communication means, and may include a variety of integrated or distributed components, such as the 3D print head 28. According to the present disclosure, the 3D print head 28 may be mounted, or supported on, a construction vehicle or machine 32 having ground engaging elements, such as, for example, wheels or tracks 33.

Thus, the construction machine 32 may be a mobile machine, capable of supporting a relatively large 3D print head 28 and moving the same relative to a print area, surface, or print bed 34. An articulated arm 35 of the mobile construction machine 32 may assist in relocating the 3D print head 28 relative to the print bed 34, as needed. Although the present disclosure is not limited to the 3D printing of specific materials or specific objects, according to some embodiments, the 3D printer 24 and 3D print head 28 may be configured for depositing cement based material 36. Such material may be useful in printing, or constructing, foundations for large structures, such as, for example, buildings and houses in various environments.

The 3D construction system 10 may also include at least one 3D perception sensor 38 for scanning a constructed portion 40 of the object 30. According to the exemplary embodiment, the 3D perception sensor 38 may include a Light Detection and Ranging (LIDAR) sensor 42, as is known to those skilled in the art. In particular, the LIDAR, or other, sensor 42 may work in conjunction with a transmitter and/or receiver system 42 and/or 45 to provide detailed 3D measurements of the object 30, or constructed portion 40 of the object 30. That is, a laser transmitter may send out a laser pulse, and the light particles may be scattered back to the receiver. The light particles that come back to the receiver may be collected with a telescope, or other similar device, and counted as a function of time. According to some embodiments, the system may use laser technology enabled with an integrated inertial/GPS system to generate quick and accurate geo-referenced data.

As shown, the LIDAR sensor 42 may be mounted on a movable arm 44, to assist in movement and positioning of the LIDAR sensor 42. Although a LIDAR sensor, or system, 42 is referenced, it is also contemplated that the perception input could include any of the following: stereo camera, mono camera with photogrammetry, scanning LIDAR and flash LIDAR, to name a few. Also, there may be a positioning component as well to define where within the structure the data was captured. The positioning could come from a variety of sources as well, including Universal Tracking Station, IMU, SLAM, ranging radio, etc.

The 3D construction system 10 may also be configured for creating an online 3D replica model 46, or scanned real 3D model, of the constructed, or partially constructed, portion 40 of the object 30 based on sensor readings from the 3D perception sensor 38. For example, the 3D construction system 10 may use CAD software and/or animation modeling software, or other software programs, available for creating the online 3D replica model 46 based on the sensor readings. The online 3D replica model 46 may then be compared to a created ideal printed 3D model based on the executed plan code or the online 3d blueprint model 22 (or corresponding parts thereof) to identify one or more differences. The ideal printed 3D model represents the digital model of the object based on the portion of the execution plan code 26 that has been executed. The 3D construction system 10 may be configured to report the difference and/or modify the control plan 26 responsive to the difference, as will be described in the exemplary method described below.

Figure 2:
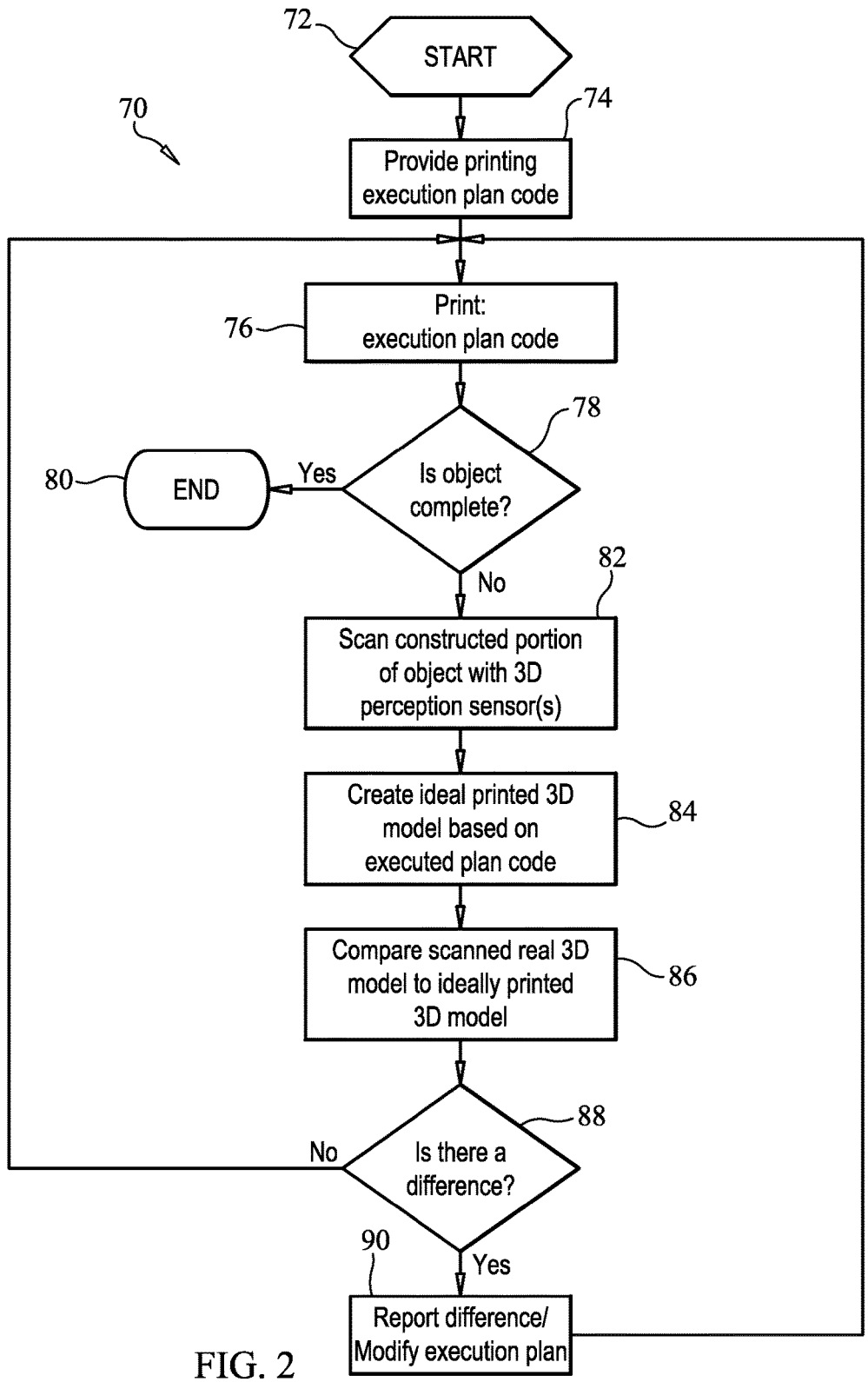
FIG. 2 is a flow diagram representing an exemplary 3D construction method for creating an object using the 3D construction system of FIG. 1, according to one aspect of the present disclosure.

Turning now to FIG. 2, but referring also to FIG. 1, an exemplary method for creating the object 30 using the 3D construction system 10 detailed above is described with reference to a flow diagram 70. The method steps may be implemented in whole or in part by the components of the 3D construction system 10, and may be implemented automatically and/or manually. The method may run continuously, intermittently, or at predetermined intervals. Not all of the steps are required, and additional or alternative method steps may be included.

The method begins at a START, shown at Step 72. At Step 74, an online 3D blueprint model 22 is created, provided, and/or accessed, for creating the object 30. That is, the online 3D blueprint model 22 and control plan, or printing execution plan code, 26 may be used to create, or print, at least a portion of the object 30 with at least the 3D printer 24 and 3D print head 28, at Step 76. That is, the printing execution plan code 26 is executed. It should be appreciated that only a portion of the printing execution plan code, or online control plan, 26, which is essentially a set of computer instructions for controlling the 3D printer 24 and print head 28 to create the object 30, may be executed at a time. That is, according to the present disclosure, a portion of the object 30 may be created and the quality assessed before the construction continues. Additionally or alternatively, some of these steps may run concurrently. At Step 78 it is determined whether the object 30 is complete. If the object 30 is complete, or construction finished, the method may proceed to an END, at Step 80. According to some embodiments, the quality of the final constructed object 30 may be assessed according to the method described herein.

If the object 30 is not complete, as determined at Step 78, the method proceeds to Step 82, and the constructed portion 40 of the object 30 is scanned with the one or more 3D perception sensors 38, as described above. An online 3D replica model 46 of the constructed portion 40 is created using sensor readings from the 3D perception sensor 38 in a known manner. At Step 84 an ideal printed 3D model based on the printing execution plan code 26, or executed portion thereof, is created using available software similar to that described above. The online 3D replica model 46 is then compared to the online 3D blueprint model 22, or portions thereof, or the ideal printed 3D model (also shown at 22), at Step 86, to determine if differences, such as noteworthy differences, exist. If a difference is detected, at Step 88, the difference may be reported and/or the online control plan or printing execution plan code 26 may be modified responsive to the difference, at Step 90. The online control plan 26 may be modified manually, on-the-fly, or automatically, depending on the identified defect. A new object or remaining portions of object 30 may be created by returning to Step 76 and repeating the steps described above.

INDUSTRIAL APPLICABILITY

The present disclosure is applicable to the 3D printing or construction of various objects. The present disclosure is further applicable to 3D printing using relatively large 3D printers and/or 3D print heads, which may be supported on mobile machines. Yet further, the present disclosure is applicable to systems and methods of assessing quality and/or detecting defects in 3D printing processes.

Although 3D printers can create objects with great precision, they still suffer from problems during the printing, or construction, process that can lead to defects in the resulting object. For example, the material may fall, the print head or delivery system may experience movement or disruption, and/or a number of other errors may occur. As should be appreciated, a small defect may expand into a large defect, sometimes rendering the object unusable and resulting in a significant amount of waste.

Referring to FIGS. 1 and 2, a 3D construction system 10 for creating an object 30, according to the present disclosure, generally includes a computer device or system 12 including at least one processing device 14 and a 3D printer 24 including a 3D print head 28. Also provided are an online 3D blueprint model 22 for the object 30 and an online control plan, or printing execution plan code, 26 for controlling operation of the 3D printer 24 and 3D print head 28 to create the object 30 according to the online 3D blueprint model 22. The 3D construction system 10 also includes at least one 3D perception sensor 38, such as a LIDAR sensor 42, for scanning a constructed portion 40 of the object 30.

The at least one processing device 14 is configured for creating an online 3D replica model 46 of the constructed portion 40 of the object 30 using sensor readings from the at least one 3D perception sensor 38, and comparing the online 3D replica model 46 to the online 3D blueprint model 22 or ideal printed 3D model to identify any differences. If any differences, or defects, are detected, a notification may be generated and/or the online control plan 26 may be modified before 3D construction continues. As a result, a significant amount of waste can be reduced. Further, utilization of a 3D perception sensor 38 offers significant advantages over alternative sensors or scanners, in that distance to targets may be identified more accurately and voids may be more accurately detected.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A three-dimensional construction system for creating an object, including:
    an online three-dimensional blueprint model for the object;
    a three-dimensional print head;
    an online control plan for controlling operation of the three-dimensional print head to create the object according to the online three-dimensional blueprint model;
    at least one three-dimensional perception sensor for scanning a constructed portion of the object; and
    at least one processing device for:
        creating an online three-dimensional replica model of the constructed portion of the object using sensor readings from the at least one three-dimensional perception sensor; and
        comparing the online three-dimensional replica model to the online three-dimensional blueprint model or an ideal printed three-dimensional model to identify a difference;
    wherein the online control plan is modified responsive to the difference.

2. The three-dimensional construction system of claim 1, wherein the online control plan includes a numerical control programming code that is stored and executed on a computer device.

3. The three-dimensional construction system of claim 2, wherein the processing device is further configured to report the difference.

4. The three-dimensional construction system of claim 1, wherein the at least one three-dimensional perception sensor is a light detection and ranging sensor.

5. The three-dimensional construction system of claim 4, wherein the light detection and ranging sensor is supported on a movable arm.

6. The three-dimensional construction system of claim 1, wherein the three-dimensional print head is configured to deposit a cement based material.

7. The three-dimensional construction system of claim 1, wherein the three-dimensional print head is supported on a mobile machine.

8. A three-dimensional construction method for creating an object using a three-dimensional construction system, the method including steps of:
    providing an online three-dimensional blueprint model for the object;
    controlling operation of a three-dimensional print head to create the object according to the online three-dimensional blueprint model using an online control plan;
    scanning a constructed portion of the object using at least one three-dimensional perception sensor;
    creating an online three-dimensional replica model of the constructed portion of the object using sensor readings from the at least one three-dimensional perception sensor;
    comparing the online three-dimensional replica model to the online three-dimensional blueprint model or an ideal printed three-dimensional model to identify a difference; and
    modifying the online control plan responsive to the difference.

9. The three-dimensional construction method of claim 8, further including:
    delaying operation of the three-dimensional print head while the online control plan is modified responsive to the difference.

10. The three-dimensional construction method of claim 8, further including:
    reporting the difference.

11. The three-dimensional construction method of claim 8, further including:
    repeating the controlling, scanning, creating, comparing, and modifying steps until the object is completed.

12. The three-dimensional construction method of claim 8, wherein the scanning step includes scanning the constructed portion of the object using a light detection and ranging sensor.

13. The three-dimensional construction method of claim 12, further including:
    moving the light detection and ranging sensor relative to the constructed portion of the object using a movable arm supporting the light detection and ranging sensor.

14. The three-dimensional construction method of claim 8, further including:
depositing a cement based material using the three-dimensional print head to create the object.

15. The three-dimensional construction method of claim 14, further including:
moving the three-dimensional print head relative to the object during the depositing step using a mobile machine supporting the three-dimensional print head.

16. The three-dimensional construction method of claim 8, further including:
performing the scanning, creating, and comparing steps simultaneously with the controlling step.

17. A three-dimensional construction system for creating an object, including:
an online three-dimensional blueprint model for the object;
a three-dimensional print head;
an online control plan for controlling operation of the three-dimensional print head to create the object according to the online three-dimensional blueprint model;
at least one light detection and ranging sensor for scanning a constructed portion of the object;
at least one GPS system coupled to the light detection and ranging sensor for generating geo-referenced data; and
at least one processing device for:
creating an online three-dimensional replica model of the constructed portion of the object using sensor readings from the at least one light detection and ranging sensor; and
comparing the online three-dimensional replica model to the online three-dimensional blueprint model or an ideal printed three-dimensional model to identify a difference;
wherein the online control plan is modified responsive to the difference.

18. The three-dimensional construction system of claim 17, wherein the light detection and ranging sensor is supported on a movable arm.

19. The three-dimensional construction system of claim 17, wherein the three-dimensional print head is configured to deposit a cement based material.

20. The three-dimensional construction system of claim 17, wherein the three-dimensional print head is supported on a mobile machine.

* * * * *